United States Patent
Jung et al.

(10) Patent No.: US 9,247,420 B2
(45) Date of Patent: Jan. 26, 2016

(54) METHOD OF MANAGING USER EQUIPMENT CAPABILITIES

(75) Inventors: Sung Hoon Jung, Anyang-si (KR); Young Dae Lee, Anyang-si (KR); Sung Duck Chun, Anyang-si (KR); Sung Jun Park, Anyang-si (KR); Seung June Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 1755 days.

(21) Appl. No.: 12/333,116

(22) Filed: Dec. 11, 2008

(65) Prior Publication Data

US 2009/0170426 A1  Jul. 2, 2009

Related U.S. Application Data

(60) Provisional application No. 61/013,021, filed on Dec. 12, 2007.

(30) Foreign Application Priority Data

Nov. 21, 2008 (KR) .................. 10-2008-0116391

(51) Int. Cl.
*H04W 4/00* (2009.01)
*H04W 8/24* (2009.01)
*H04W 76/02* (2009.01)

(52) U.S. Cl.
CPC ............. *H04W 8/24* (2013.01); *H04W 76/02* (2013.01)

(58) Field of Classification Search
CPC ........... H04W 8/22; H04W 8/24; H04W 8/08; H04W 76/02; H04L 67/303
USPC ......... 455/435.1–435.2, 432.3, 433, 424, 425
See application file for complete search history.

(56) References Cited

U.S. PATENT DOCUMENTS

2003/0060197 A1* 3/2003 Benes et al. .................. 455/433
2010/0330959 A1* 12/2010 Mildh et al. .................. 455/410

FOREIGN PATENT DOCUMENTS

WO  WO 2007/109695  9/2007

OTHER PUBLICATIONS

Ericsson "UE Capability Transfer", 3GPP TSG-RAN WG2 Ad Hoc on LTE RRC, Tdoc R2-075515, vol. RAN WG2, No. Vienna, Austria, Dec. 6, 2007, XP050142064.
Ericsson, "Handling of UE Capability Information in SAE/LTE", 3GPP TSG-RAN WG2 #57, Tdoc R2-070578, vol. RAN WG2, No. St. Louis, USA, Feb. 9, 2007, XP050133630.
Ericsson, "Signaling Method for Uploading UE Capability Information", 3GPP TSG-RAN WG2 #59-bis, Tdoc R2-074098, vol. RAN WG2, No. Shanghai, China, Oct. 1, 2007, XP050136728.

* cited by examiner

*Primary Examiner* — Rafael Pérez-Gutiérrez
*Assistant Examiner* — Thai Vu
(74) *Attorney, Agent, or Firm* — Birch, Stewart, Kolasch & Birch, LLP

(57) ABSTRACT

The present invention is directed to a wireless communication system. Particularly, the present invention is directed to a method of managing a user equipment (UE) capability at a Mobility Management Entity (MME) via a base station of a network in a wireless communication system, the method comprising selectively forwarding an indication of a UE capability stored in the MME to the base station or sending a request from the MME to the base station to obtain a current UE capability from the UE in accordance with whether or not a certain condition is satisfied.

9 Claims, 11 Drawing Sheets

METHOD OF MANAGING USER EQUIPMENT CAPABILITIES

This application claims the benefit of U.S. Provisional Patent Application No. 61/013,021, filed on Dec. 12, 2007 and Korean Patent Application No. 10-2008-0116391, filed on Nov. 21, 2008, which are hereby incorporated by reference as if fully set forth herein.

BACKGROUND OF THE INVENTION

1. Field of the Invention

The present invention relates to a wireless communication system, and more particularly to a method for managing user equipment capabilities in a wireless communication system.

2. Discussion of the Related Art

Typically, a 3rd Generation Partnership Project (3GPP) mobile communication system based on a Wideband Code Division Multiple Access (WCDMA) radio access technology has been widely developed throughout the world. A High Speed Downlink Packet Access (HSDPA) defined as a first evolution step of a WCDMA technology provides the 3GPP system with a high-competitiveness wireless access technology in the near and mid-term future. However, the number of requests and expectations of users and enterprisers is rapidly increasing, and the wireless access technology is being intensively developed, such that there is needed a new or improved technology of the 3GPP in order to implement a high competitiveness in the future. For example, the cost for each bit, the increase of service availability, an adaptable use of frequency band, a simple structure, an open-type interface, and appropriate power consumption of user equipment (UE) are needed for the 3GPP.

In order to manage the mobility of a user equipment (UE), an EPS Mobility Management-REGISTERED (EMM-REGISTERED) status and an EMM-DEREGISTERED status are defined in the 3GPP LTE system. The EMM-REGISTERED status and the EMM-DEREGISTERED status are applied to a Mobility Management Entity (MME). The user equipment (UE) is initially in the EMM-DEREGISTERED status, and carries out an 'Initial Attach' procedure to access a network, such that it is registered in this network. If this 'Attach' procedure has been successfully carried out, the UE and the MME become enter the EMM-REGISTERED status.

In order to manage a signaling connection between the UE and the EPC, an EPS Connection Management (ECM)-IDLE status and an ECM-CONNECTED status are defined. The above-mentioned statuses are applied to the UUE and the MME. The UE of the ECM-IDLE status is in the ECM-CONNECTED status when it makes a RRC connection with an E-UTRAN. If the MME of the ECM-IDLE status makes a S1 connection with the E-UTRAN, it becomes enter the ECM-CONNECTED status. If the UE is in the ECM-IDLE status, the E-UTRAN has no context information of the UE. Therefore, the UE of the ECM-IDLE status carries out an UE-based mobility procedure (e.g., a cell selection or a cell reselection) without receiving a command from the network. Otherwise, if the UE is in the ECM-CONNECTED status, the UE mobility is managed by the network. If the UE is in the ECM-IDLE status and the UE's location recognized by the network is changed to another UE location, the UE performs a Tracking Area Update procedure, such that it informs the network of the UE's location.

If a connection between a base station (or eNode-B) and a user equipment (UE) is established, the base station (BS) requests user equipment (UE) capability information from the user equipment (UE), such that it can establish radio resources for the user equipment (UE). In order to allow a network to manage the UE (e.g., a support of UE mobility), the UE capability information is needed. The UE capability information may include a variety of information for managing/operating radio resources of the UE, for example, a power control associated information, code resource information, encryption-associated information, and a PDCP-associated capability. The UE capability information may include a radio access technology (RAT) supported by the UE.

FIG. 1 is a conceptual diagram illustrating a conventional delivery flow of the UE capability during the 'Attach' process of the UE. Detailed descriptions of FIG. 1 are as follows.

First, the UE establishes a Radio Resource Control (RRC) connection. Namely, the UE performs the RRC connection establishment by sending a message with a Random Access Channel (RACH) preamble to the eNode-B (eNB), receiving an initial allocation from the eNB, and sending a RRC CONNECTION SETUP message to the eNB. If the RRC connection has been successfully established, the UE transmits a RRC CONNECTION COMPLETE message to the eNB. The UE includes a NAS 'Attach Request' message in the RRC message.

Second, if the eNodeB (eNB) receives the RRC connection complete message, the eNB transmits a S1 control message (i.e., initial UE message) having the NAS message (Attach Request) to the MME.

Third, in response to the 'Attach Request' message, there is an authentication process between the UE, the eNB and the MME, including a step where the MME transmits the S1 control message (i.e., Initial Context Setup Request) to the eNode-B (eNB).

Fourth, the eNode-B (eNB) receives the 'Attach Accept' message from the MME.

Fifth, the eNode-B (eNB) carries out an initial security activation process including sending a SECURITY MODE COMMAND message to the UE and receiving a corresponding SECURITY MODE COMPLETE message from the UE.

Sixth, the eNode-B (eNB) receives UE capability information from the UE by sending a UE CAPABILITY ENQUIRY message to the UE and receiving a corresponding UE CAPABILITY INFORMATION message from the UE.

Seventh, the eNode-B (eNB) performs a RRC Connection Reconfiguration procedure using the received UE capability information, such that it acquires the latest UE capability from the UE. This includes sending a RRC CONNECTION RECONFIGURATION message with a NAS: Attach Accept datum to the UE, and receiving a corresponding RRC RECONFIGURATION COMPLETE message from the UE.

Eighth, the eNode-B (eNB) transmits a SI control message (Initial Context Setup Response) having the UE capability information to the MME.

With the conventional process shown in FIG. 1, the UE capability is transferred to the network whenever the UE establishes the RRC connection. However, as the UE supporting various wireless access technologies is introduced to the market and the UE function becomes more complex, the UE capability is gradually increasing. In view of increasing UE capability and increasingly large UE capability information sizes, the conventional method for transferring a large amount of information to the network whenever the RRC connection is established unavoidably encounters unnecessary consumption of radio resources.

SUMMARY OF THE INVENTION

Accordingly, the present invention is directed to a method for managing user equipment capabilities that substantially obviates one or more problems due to limitations and disadvantages of the related art.

An object of the present invention is to provide a method for effectively managing UE capabilities over a network of a wireless communication system.

Another object of the present invention is to provide a method for reducing an amount of radio resources needed for delivering the UE capability.

Another object of the present invention is to provide a method for delivering the latest UE capability to a network only when the UE capability is changed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of managing user equipment (UE) capability at Mobility Management Entity (MME) of a network in a wireless communication system, the method comprises: receiving a first status indication related to UE capability; determining whether or not a certain condition is satisfied using the first status indication; and selectively forwarding the UE capability to a base station or requesting the base station to obtain the UE capability in accordance with whether or not the certain condition is satisfied.

In another aspect of the present invention, there is provided a method of obtaining user equipment (UE) capability in a wireless communication system, the method comprising: receiving from the UE a status indication related to the UE capability; forwarding the status indication to Mobility Management Entity (MME) of a network; and receiving the UE capability from the MME, or performing a procedure to obtain the UE capability in accordance with a request from the MME.

Embodiments of the present invention have the following effects.

First, an amount of radio resources needed for transferring the UE capability can be greatly decreased.

Second, the UE transfers its capability information only when the UE capability is changed, resulting in reduction of an amount of overhead encountered by the UE operation.

Third, the present invention reduces an amount of UE capability information communicated between networks, such that it can increase the efficiency of network resource usage.

Fourth, the network entity operation is limited to a message directly related to a corresponding layer, such that independency between AS and NAS layers can be maintained.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers, labels and/or acronyms will be used throughout the drawings to refer to the same or like parts.

The above and other configurations, operations, and features of the present invention will be easily understood from the embodiments of the invention described below with reference to the accompanying drawings. The embodiments described below are examples wherein technical features of the invention are applied to an Evolved Universal Mobile Telecommunications System (EUMTS).

Figure 1:
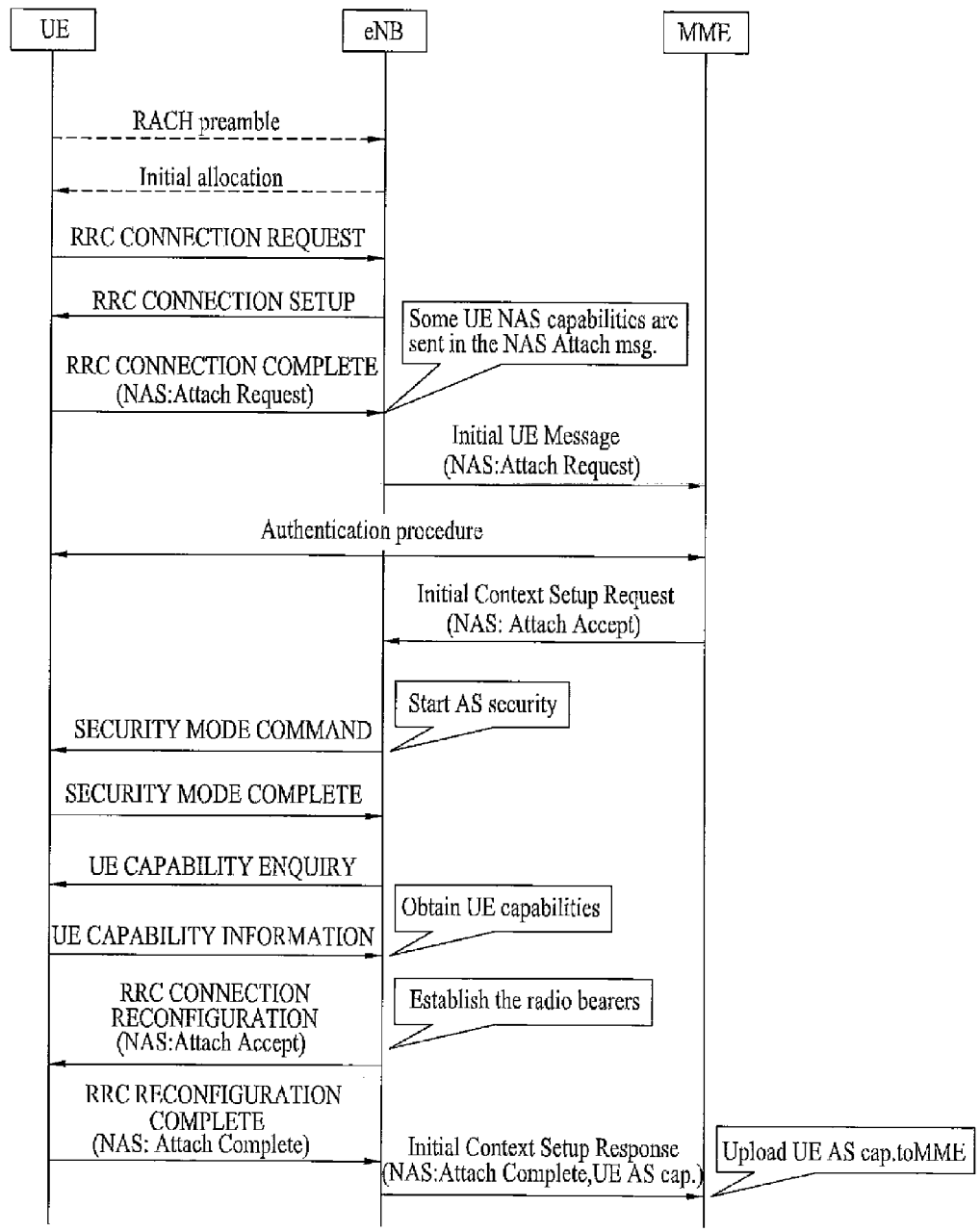
FIG. 1 is a conceptual diagram illustrating a conventional method for transferring the UE capability during a network connection time.
Figure 2:
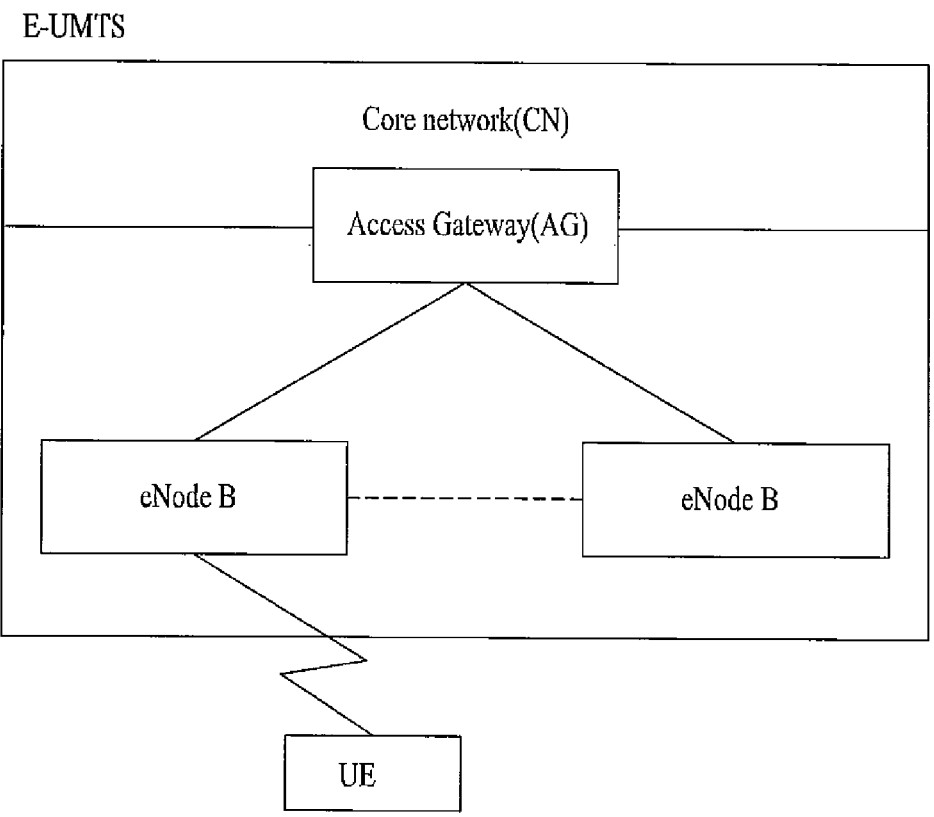
FIG. 2 is a schematic diagram illustrating an Evolved-Universal Mobile Telecommunications System (E-UMTS) network according to the present invention.

FIG. 2 shows a network structure of the E-UMTS to which an embodiment of the present invention is applied. The E-UMTS system is an evolved version of the conventional WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network", the entire contents of which are incorporated by reference.

As shown in FIG. 2, the E-UMTS includes a User Equipment (UE), a base station (or eNB or eNode-B), and an Access Gateway (AG) which is located at an end of a network (E-UTRAN) and which is connected to an external network. Generally, an eNB can simultaneously transmit multiple data streams for a broadcast service, a multicast service and/or a unicast service.

The AG can be divided into a part that processes of user traffic and a part that processes control traffic. The AG part for processing new user traffic and the AG part for processing control traffic can communicate with each other using an interface. One or more cells may exist for one eNB. An interface for transmitting user traffic or control traffic can be used between eNBs.

A Core Network (CN) may include the AG and a network node or the like for user registration of the UE. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 3:
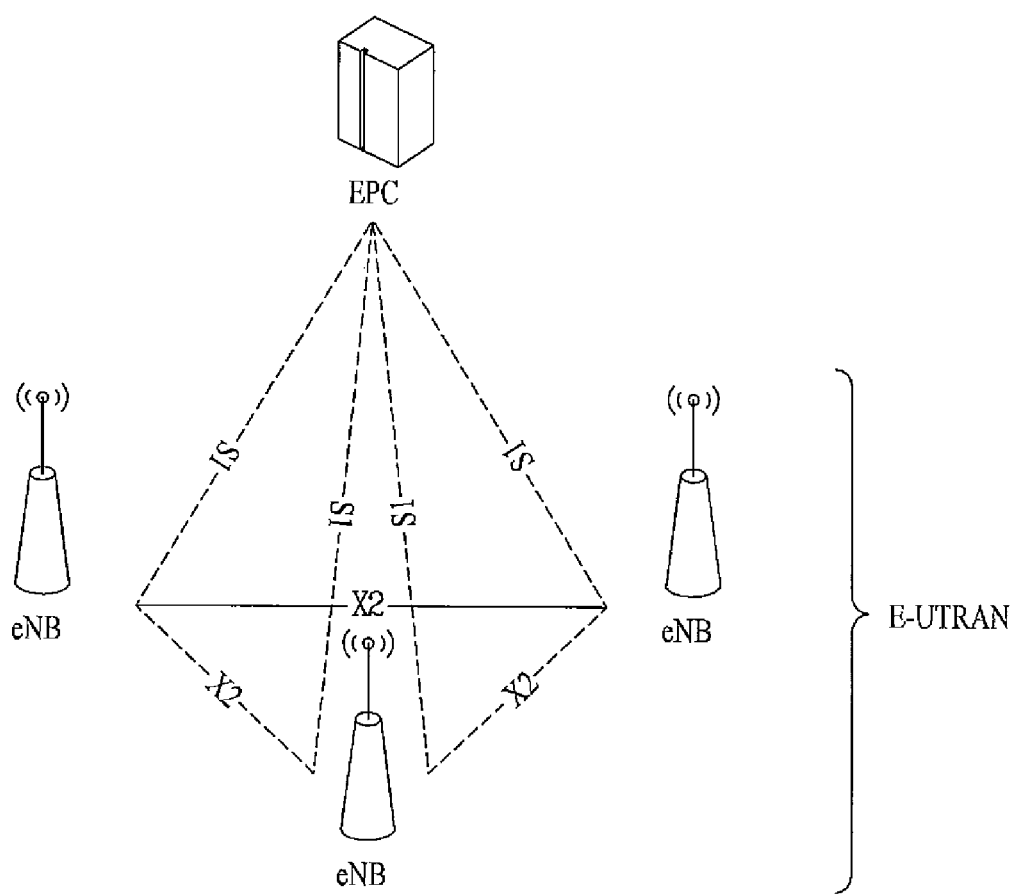
FIG. 3 is a structural diagram illustrating an Evolved-Universal Terrestrial Radio Access Network (E-UTRAN) according to the present invention.

FIG. 3 illustrates a network structure of an Evolved Universal Terrestrial Radio Access Network (E-UTRAN) system which is a mobile communication system to which the embodiment of the present invention is applied. The E-UTRAN system is an evolved version of the conventional UTRAN system. The E-UTRAN includes a base station that will also be referred to as "enode B" or "eNB". The eNBs are connected through an X2 interface. Each eNB is connected to the User Equipment (UE) through a radio interface and is connected to an Evolved Packet Core (EPC) through a S1 interface. The eNB and the EPC exchange S1 control messages through the S1 interface. The S1 control message refers to a set of signaling messages between eNB and EPC (e.g., MME) to fulfill S1-AP functions, such as SAE Bearer management function, Initial Context Transfer function, UE Capability Info Indication function, Paging, NAS Signalling transport function between the UE and the MME is used, and so on.

Figure 4:
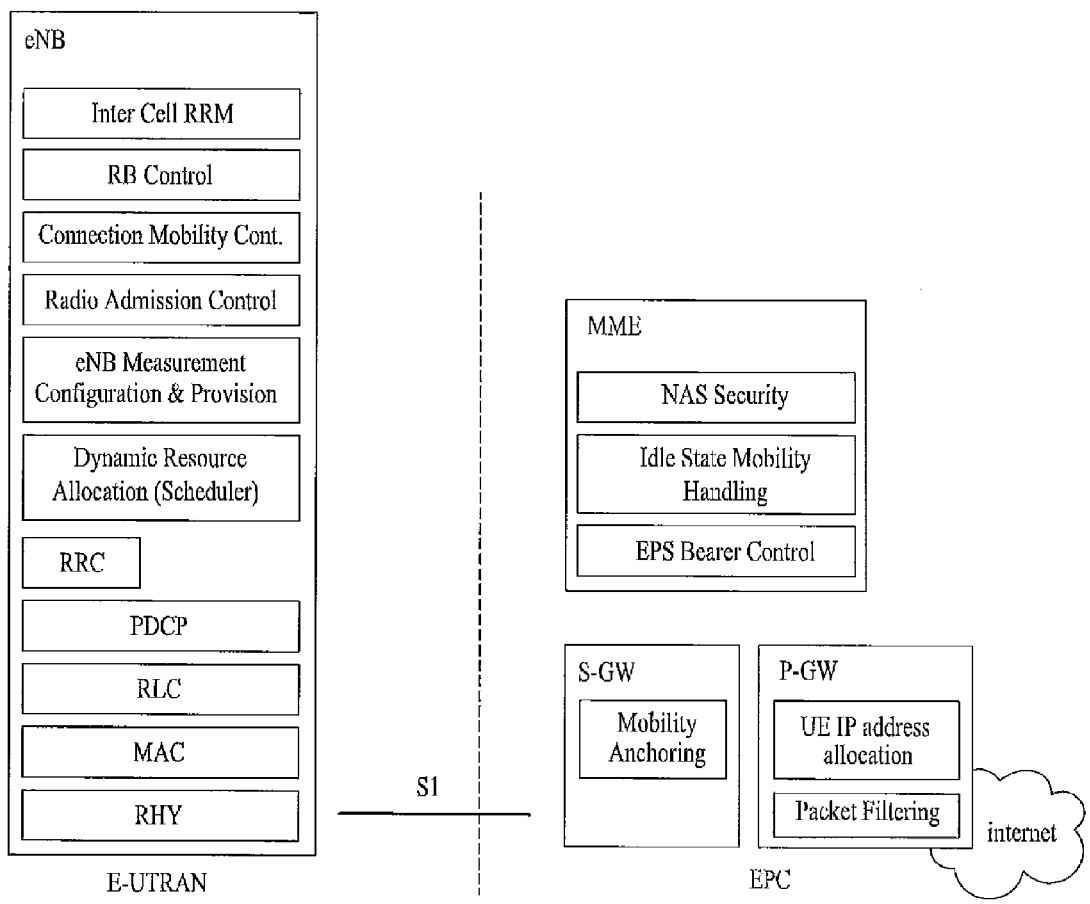
FIG. 4 is a block diagram illustrating a logic architecture of typical network entities of the LTE system.

FIG. 4 is a block diagram illustrating an architecture of E-UTRAN and EPC. As illustrated, eNodeB may perform functions of selection for gateway, routing toward the gateway during a radio resource control (RRC) activation, scheduling and transmitting of paging messages, scheduling and transmitting of broadcast channel (BCCH) information, dynamic allocation of resources to UEs in both uplink and downlink, configuration and provisioning of eNodeB measurements, radio bearer control, radio admission control (RAC), and connection mobility control in LTE_ACTIVE state. In the EPC, and as noted above, gateway may perform functions of paging origination, LTE-IDLE state management, ciphering of the user plane, system architecture evolution (SAE) bearer control, and ciphering and integrity protection of non-access stratum (NAS) signalling.

The Mobility Management Entity (MME) is a kernel control node of the LTE access network. The MME performs tracking and paging of an UE in idle mode. The MME participates in a radio bearer activation/inactivation process. In case of either 'Initial Attach' or an intra-LTE handover having core network relocation, the MME takes charge of a serving gateway (SGW) selection associated with the UE. The MME performs UE authentication by interacting with a Home Subscriber Server (HSS). The NAS signaling is ended at the MME, and the MME generates a temporary identifier and allocates this temporary identifier to the UE. The MME determines whether or not the UE has a camp-on authority associated with a Public Land Mobile Network (PLMN) of a service provider. The MME is an end point for protecting the encryption/integrity for NAS signaling, and manages a security key. The MME provides a control plane function for the mobility between the LTE and the 2G/3G access network.

Figure 5:
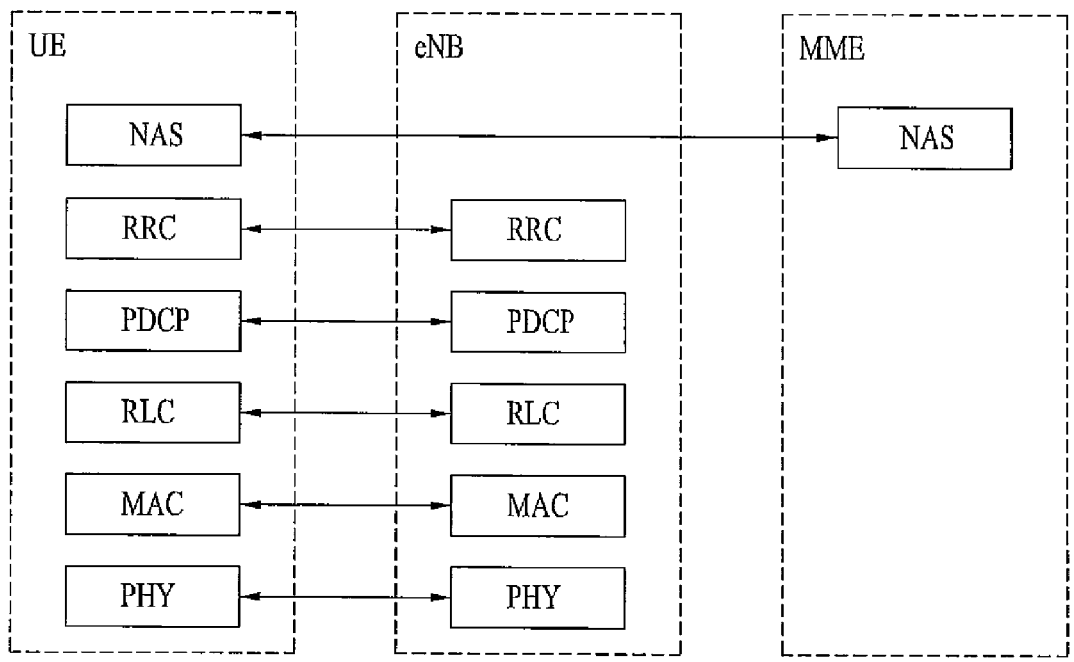
FIG. 5 is a structural diagram illustrating a control plane of a Radio Interface Protocol between the UE and the E-UTRAN according to the present invention.
Figure 6:
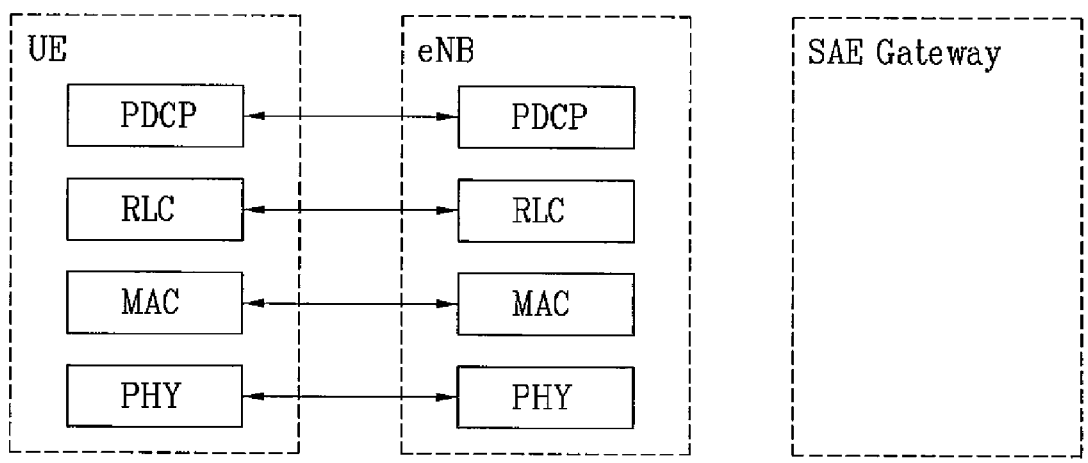
FIG. 6 is a structural diagram illustrating a user plane of a Radio Interface Protocol between the UE and the E-UTRAN according to the present invention.

FIGS. 5 and 6 illustrate the configurations of a control plane and a user plane of a radio interface protocol between a UE and a UMTS Terrestrial Radio Access Network (UTRAN) based on the 3GPP radio access network standard. The radio interface protocol is divided horizontally into a physical layer, a data link layer and a network layer, and vertically into a user plane for data transmission and a control plane for signaling. The protocol layers of FIGS. 5 and 6 can be divided into a L1 layer (first layer), a L2 layer (second layer) and a L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports data transmission with reliability. The functions of the RLC layer may also be implemented through internal functional blocks of the MAC layer. In this case, the RLC layer need not be existed. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the lowermost of the third layer is defined only in the control plane and is responsible for control of logical, transport, and physical channels in association with configuration, re-configuration and release of Radio Bearers (RBs). The RB is a service that the second layer provides for data communication between the UE and the UTRAN. To accomplish this, the RRC layer of the UE and the RRC layer of the network exchange RRC messages. The UE is in RRC connected mode if RRC connection has been established between the RRC layer of the radio network and the RRC layer of the UE. Otherwise, the UE is in RRC idle mode.

A Non-Access Stratum (NAS) layer located above the RRC layer performs functions such as session management and mobility management. The NAS layer exists in the MME of the UE and network.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Embodiment

Delivery/Reuse of UE Capability Information

As noted previously, when the size of UE capability information is considerably large, that the conventional method of providing the UE capability information to the network unavoidably encounters a large amount of overhead whenever the UE status is changed from the ECM-IDLE mode to the ECM-CONNECTED mode.

Therefore, the present invention provides a novel and improved mechanism of providing the UE capability information to the network, whereby the UE capability information is stored in the network and the stored UE capability information is reused as necessary. For example, the UE capability information can be reused when the UE status is changed from the ECM-IDLE mode to the ECM-CONNECTED mode. The UE capability information may be stored in the Mobility Management Entity (MME) of the network. Provided that the MME has proper UE capability information when the UE status is changed from the ECM-IDLE status to the ECM-CONNECTED status, the MME instead of the UE may provide the eNB with the UE capability information.

In order to reuse the UE capability stored in the network, the present invention includes a mechanism for determining whether the stored UP capability matches the present one of the UE. This is desirable in consideration of changeable characteristics of the UE capability.

A representative example of the above-mentioned mechanism may be a status indicator associated with the UE capability. The term "status indicator" may be interchanged with "version indicator." The UE may assign different status indicators to individual UE capabilities. In other words, the same status indicator indicates that the UE capability information is the same. Therefore, if the status indicator of the UE is equal to that of the network, the UE capability information of the network may be considered to be the present UE capability information.

For the convenience of description, the status indicator owned by the UE may be called a first status indicator, and the other status indicator owned by the network may be called a second status indicator. In one embodiment, the second status indicator may be stored in the MME. In other embodiments, the second status indicator may be stored in another location external to the UE.

The status indicator may be a value tag. In other words, the method for changing a value of the value tag whenever the UE capability is changed to another can be used. For example, the UE transmits the value tag to the network whenever a procedure for requesting the UE capability is carried out. A representative example of the above-mentioned requesting procedure is a 'Service Request' procedure. The 'Service Request' procedure is to transfer the EMM mode from EMM-IDLE to EMM-CONNECTED mode and establish the radio and S1 bearers when uplink user data is to be sent. This procedure is also to invoke MO/MT CS fallback procedures. In this procedure for requesting the UE capability, the network compares a value tag received from the UE (i.e., a first value tag) with another value tag in the network (i.e., a second value tag). If the first value tag is different from the second value tag, the network determines that the stored UE capability information is not the present UE capability information.

As described above, the UE capability information and the status indicator may be stored in the MME, but the comparison of the status indicators and the decision indicating whether the UE capability information stored in the network is reused can be carried out by either the eNB or the MME. The eNB requesting the above UE capability may be a serving eNB. An exemplary process for carrying out the above-mentioned procedure will hereinafter be described in detail.

eNode-B (eNB) Process

1. The eNB receives a NAS first status indicator contained in the RRC message from the UE.
2. The eNB receives the first status indicator from the NAS container.
3. The eNB receives the UE capability information and a second status indicator from the MME.
4-1. If the first status indicator matches the second status indicator, the eNB uses the UE capability information received from the MME.
4-2. if the first status indicator is different from the second status indicator, the eNB discards the UE capability information received from the MME, and requests the UE to send capability information.

MME Process

1. The MME receives a NAS first status indicator.
2-1. If the first status indicator matches the second status indicator of the MME, the MME transmits the stored UE capability information to the eNB.
2-2. If the first status indicator is different from the second status indicator, the MME requests the eNB to obtain the UE capability information.

As described above, deciding whether the UE capability information stored in the MME is the present one and deciding whether the stored information is reused can be carried out by each of the eNB and the MME. However, it is preferable that the above-mentioned procedure is carried out by the MME for the following first and second reasons.

The first reason why it is preferable that the above-mentioned procedure is carried out by the MME is: if the eNB determines that the UE capability information stored in the MME is the latest information, the MME must transfer the UE capability information to the eNB although it does not recognize whether its own capability information is the latest or not. Therefore, if the eNB receives the UE capability information and the received UE capability information is not determined to be the latest information, the S1 interface resources are unnecessarily consumed.

Otherwise, if the MME determines that the UE capability information is the latest information, it provides the eNB with the UE capability information only when the stored UE capability information is the latest information. Therefore, the problem of generating the S1 interface resources unnecessarily consumed for transmitting unavailable UE capability information can be solved.

The first reason why it is preferable that the above-mentioned procedure is carried out by the MME is: if the eNB determines that the UE capability information stored in the MME is the latest information, the eNB must read the status indicator contained in the NAS container of the RRC message received from the UE, such that it can carry out the comparison of the status indicators. If the eNB acting as the network entity associated with the AS layer checks contents of the NAS container between the UE and the MME, this checking operation cause damage to the independency between the AS layer and the NAS layer, such that it is considered to be ineffective.

Otherwise, if the MME determines whether the UE capability information is the latest information, the MME need not transfer a status indicator associated with the UE capability information to the eNB. Therefore, the eNB need not read the status indicator contained in the NAS container of the RRC message received from the UE, and guarantees the independency between the AS layer and the NAS layer.

A method for transferring/reusing the UE capability information on the basis of the MME according to one embodiment of the present invention will hereinafter be described in detail. For example, although only a specific case of the UE performing the 'Attach' and 'Service Request' procedures will hereinafter be described, the present invention is not limited to only this specific case in which the UE performs the 'Attach' and 'Service Request' procedures. The present invention may also be applied to another procedure in which a network entity such as the eNB can download or receive the UE capability information from the MME.

Transmission of UE Capability Information During the 'Attach' Procedure

If the UE carries out the 'Attach' procedure, the UE capability information associated with the UE may be invalid in the MME or may not exist in the MME. Therefore, during the 'Attach' procedure, although the UE capability information is stored in the MME, the UE capability information may be ignored and the latest capability information may be received from the corresponding UE. Therefore, the MME can manage/maintain the latest UE information. In more detail, during the 'Attach' procedure, the following cases 1 to 3 can be carried out.

Case 1

If the UE does not transmit the status indicator, the capability information of the corresponding UE may be pre-stored in the MME. Although the conventional status indicator has been stored in the MME, it is assumed that the MME does not have the latest UE capability information in consideration of the 'Attach' procedure performed by the UE. Therefore, the MME requests the UE capability information from the eNB, and stores the UE capability information received from the UE.

Case 2

If the UE transmits the status indicator, the capability information associated with the corresponding UE may be pre-stored in the MME. Although the stored status indicator is equal to the received status indicator, it is assumed that the MME does not have the latest UE capability information in consideration of the 'Attach' procedure performed by the UE. Therefore, the MME replaces the stored status indicator with the status indicator received from the UE. Thereafter, the MME requests the UE capability information from the eNB, and stores the received UE capability information received from the UE via the eNB.

Case 3

If the UE transmits the status indicator, the MME may not have UE information of the corresponding UE. Since the MME has no UE capability information, it requests the UE capability information from the eNB, and stores the UE capability information received from the UE.

A method for transferring the UE capability information during the 'Attach' procedure according to the present invention will be described with reference to FIGS. 7 and 8.

Figure 7:
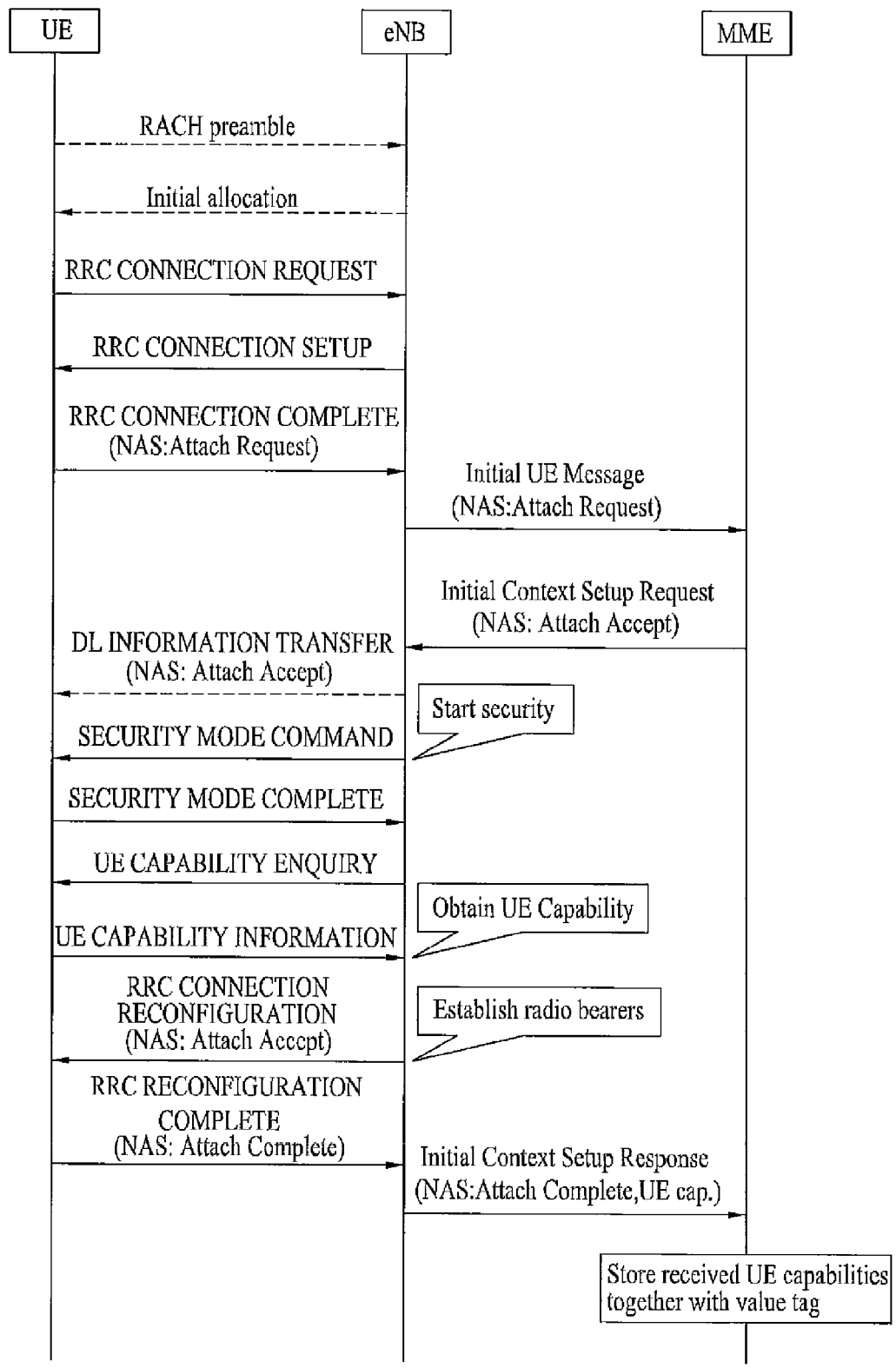
FIG. 7 is a flow chart illustrating a method for transferring the UE capability in case of 'Initial Attach' according to one embodiment of the present invention.

FIG. 7 is a flow chart illustrating a method for transferring the UE capability in case of 'Initial Attach' according to one embodiment of the present invention.

Referring to FIG. 7, the 'Initial Attach' procedure is shown in the following Steps 1)~10).

Step 1) The UE establishes the RRC connection. The RRC connection establishment may be carried out by a random access procedure. For example, the UE transmits the RACH preamble, and the eNB allocates uplink resources to the UE in response to the preamble. Thereafter, the UE transmits the 'RRC CONNECTION REQUEST' message to the eNB, and the eNB transmits the 'RRC CONNECTION SETUP' message to the UE. If the RRC connection has been successfully established, the UE transmits the 'RRC CONNECTION COMPLETE' message to the eNB. The UE includes the NAS 'Attach Request' message in the 'RRC CONNECTION COMPLETE' message.

Step 2) The eNB transmits a first S1 control message including the NAS 'Attach Request' message to the MME via the S1 interface. In this case, the first S1 control message may be an 'Initial UE Message' or a control message corresponding to this 'Initial UE Message'. The 'Initial UE Message' is a message sent by the eNB to transfer the initial layer 3 message to the MME over the S1 interface. The 'Initial UE Message' contains a NAS message (e.g. Attach Request, Service Request, etc.), the UE signalling reference ID and other S1 addressing information Step 3) The MME transmits a second S1 control message having the NAS 'Attach Accept' message to the eNB in response to the NAS 'Attach Request' message. The second S1 control message may be the 'Initial Context Setup Request' message or may be another control message corresponding to this 'Initial Context Setup Request' message. The 'Initial Context Setup Request' message is one of SL-AP control message sent by MMB to eNB during Initial Context Setup procedure. The purpose of the Initial Context Setup procedure is to establish the necessary overall initial UE Context including SAE Bearer context, Security context, Handover Restriction List, UE capability information, NAS PDU etc. The procedure uses UE-associated signalling.

Step 4) The eNB receives the second S1 control message having the NAS 'Attach Accept' message from the MME.

Step 5) The eNB may transfer a message having the NAS 'Attach Accept' received from the MME to the UE. The message is used to transfer the NAS 'Attach Accept' from the MME to the UE. If the NAS 'Attach Accept' is transferred to the UE via another procedure, the above-mentioned message may be omitted. The above message may be the 'DL INFORMATION TRANSFER' message. Thereafter, the eNB may carry out an initial security activation procedure. In more detail, the eNB transfers the 'SECURITY MODE COMMAND' message to the UE. After performing the security activation according to the above message, the 'SECURITY MODE COMPLETE' message is transferred to the eNB.

Step 6) Since the eNB has not received the UE capability information from the MME, it receives the capability information from the UE via the RRC procedure (i.e., UE Capability transfer RRC procedure) for transferring the UE capability. In more detail, the eNE transmits the 'UE CAPABILITY ENQUIRY' message requesting the latest UE capability to the UE. The UE transmits the 'CAPABILITY INFORMATION' message having the latest UE capability information to the eNB in response to the above message. The 'CAPABILITY INFORMATION' message may include a value tag associated with the UE capability.

Step 7) The eNB performs the RRC connection reconfiguration procedure using the received UE capability information. In more detail, the eNB transmits the RRC CONNECTION RECONFIGURATION message to the UE, such that it can establish the radio bearer and command the RRC connection reconfiguration. If the NAS 'Accept Attach' message is transferred to the UE via the 'DL INFORMATION TRANSFER' message in the step 5), the RRC message may not have the NAS 'Accept Attach' message. Meanwhile, if the 'DL INFORMATION TRANSFER' message is not transferred at the step 5), the eNB includes the NAS 'Attach Accept' message received from the MME in the 'RRC CONNECTION RECONFIGURATION' message. After completing the RRC connection reconfiguration, the UE transmits the 'RRC RECONFIGURATION COMPLETE' message to the eNB. The RRC message may have NAS 'Attach Complete' message which informs the MME of the success of the 'Attach' procedure.

Step 8) The eNB transmits a third S1 control message having the NAS 'Attach Complete' message and the UE capability information to the MME via the S1 interface. The third S1 control message is a response to the second S1 control message received from the MME. The third S1 control message may be an 'Initial Context Setup Response' message or a control message corresponding to the 'Initial Context Setup Response' message. The 'Initial Context Setup Response' message is one of S1-AP control message sent by eNB to MME in response to the 'Initial Context Setup Request' during Initial Context Setup procedure. The third S1 control message may include the NAS 'Attach Complete' message received from the UE.

Step 9) The MME considers the received UE capability information to be the latest information, and stores the latest information.

Step 10) The MME considers a value tag contained in the UE capability information received from the eNB to be a desirable value tag corresponding to the latest UE capability, and stores this value tag.

The corresponding UE capability and its value tag may be pre-stored in the MME at the step 3. Although the conventional value tag has been pre-stored, the MME considers the UE performing the 'Initial Attach' procedure, such that it is determined that the UE capability information stored in the MME is not the latest information. Therefore, the MME performs the above-mentioned steps 5~10, such that it acquires the latest UE capability information and its value tag.

Also, the order of steps 5 and 6 may be changed to another order according to encryption or decryption of the RRC message associated with the 'UE Capability transfer' procedure.

Figure 8:
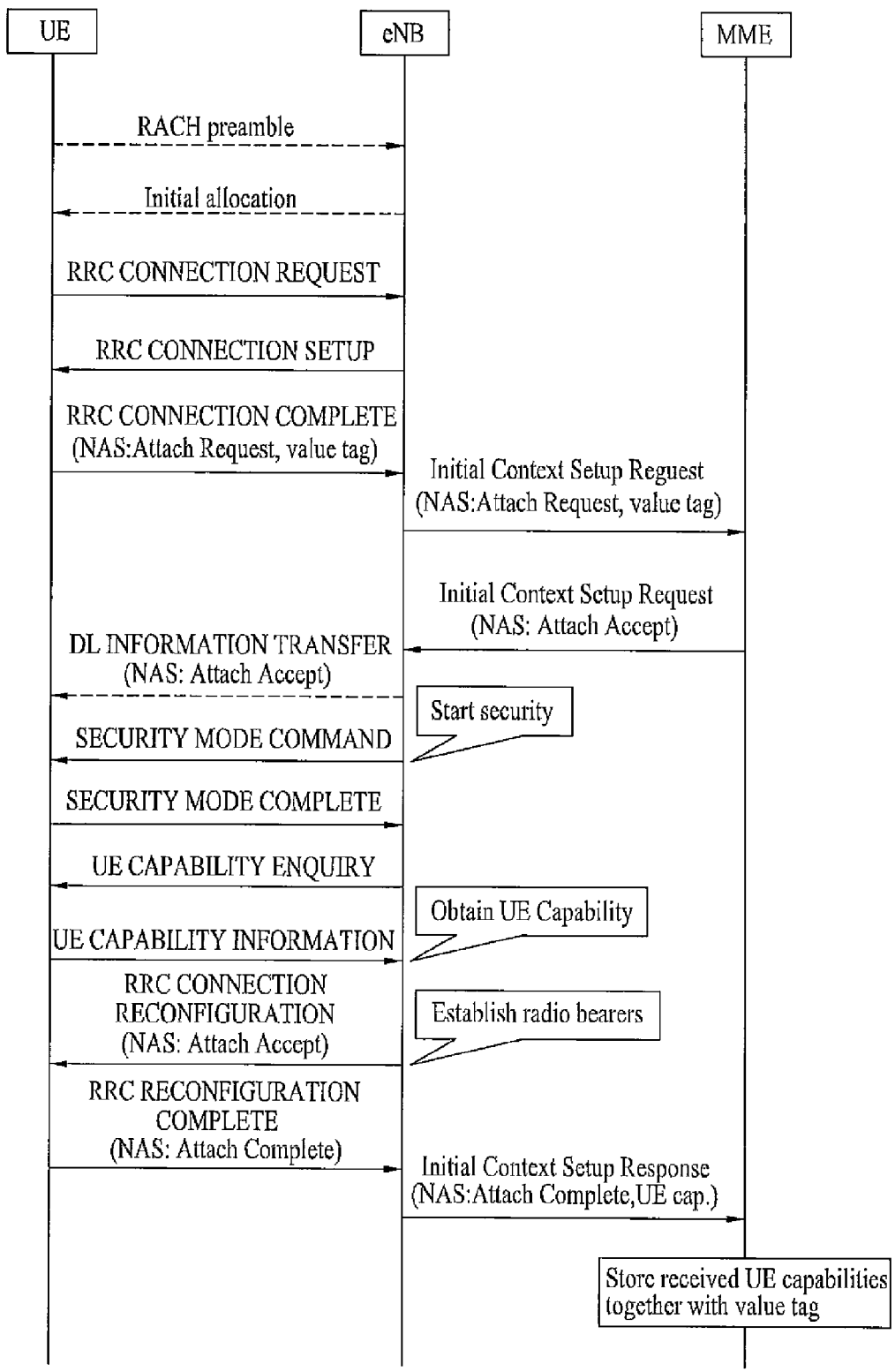
FIG. 8 is a flow chart illustrating a method for transferring the UE capability in case of 'Initial Attach' according to another embodiment of the present invention.

FIG. 8 is a flow chart illustrating a method for transferring the UE capability in case of 'Initial Attach' according to another embodiment of the present invention. Except that the value tag associated with the UE capability information is initially and separately transferred, the remaining steps of FIG. 8 are basically identical with those of FIG. 7. Referring to FIG. 8, it can be seen that the steps 1~3 of FIG. 7 have been modified such that the UE initially transmits the value tag to the MME, and detailed description of the modification will hereinafter be described in detail. The following step 10 will be omitted.

1) The UE establishes the RRC connection. If the RRC connection has been successfully established, the UE transmits the 'RRC CONNECTION COMPLETE' message to the eNB. The UE allows the RRC message to have the NAS 'Attach Request' message and the NAS value tag associated with the latest capability.

2) The eNB transfers a first S1 control message including the NAS 'Attach Request' message and the NAS value tag to the MME via a first S1 interface.

3) The MME, in response to the NAS 'Attach Request', transfers a second S1 control message having the NAS 'Attach Accept' to the eNB via the S1 interface. Also, the MME stores the above value tag, and considers this value tag to be a desirable value tag associated with the latest UE capability acquired from the steps 4~9.

At the above step 3, the corresponding UE capability information may have or may have not been stored in the MME. The MME considers the 'Initial Attach' procedure, such that it requests the latest UE capability information from the eNB irrespective of the presence or absence of the UE capability.

FIGS. 7 and 8 illustrate that the UE capability and its value tag are simultaneously stored. These figures illustrate the relationship between the UE capability and its value tag. Thus, FIGS. 7 and 8 do not mean to illustrate that the UE capability and the value tag should be simultaneously stored. The UE capability and the value tag may be simultaneously stored or be stored in different times according to their implementation examples.

Transmission/Reuse of UE Capability Information in Case of 'Service Request'

If the UE performs the 'Service Request' procedure to answer a paging signal of a network or transmit user data generated by the user to the network, the UE capability information generally exists in the MME. If the eNB must recognize the UE capability and the MME has the latest UE capability information, the eNB may download (or receive) the corresponding UE capability from the MME and use the downloaded UE capability information. If the UE capability information owned by the MME is not the latest information or the MME does not have the UE capability information, the MME requests the latest UE capability information from the eNB. For example, if the MME receives a value tag from the UE (i.e., a first value tag), it is determined whether or not the stored value tag (i.e., a second value tag) exists in the MME. If the second value tag exists, it is determined whether the first value tag is identical with the second value tag. If any of the above conditions is not satisfied, the MME determines that the stored UE capability information is not the latest information. The MME replaces the second value tag with the first value tag, and requests the latest UE capability information from the eNB.

Upon receipt of the above request, the eNB acquires the latest UE capability information from the UE, and transmits the acquired information to the MME. In more detail, the eNB having received the above request from the MME transmits to the UE a command for indicating to transmit the capability information. The UE having received the command from the eNB transmits its own capability information to the eNB. The eNB transmits the capability information received from the UE to the MME. The MME considers the latest information of a corresponding UE and stores this latest UE information. If required, the above-mentioned capability information may simultaneously include a value tag associated with the capability information. In this case, the MME stores the value tag contained in the UE capability together with the latest capability information.

A method for performing the 'Service Request' procedure according to the present invention will hereinafter be described with reference to FIGS. 9 to 11.

Figure 9:
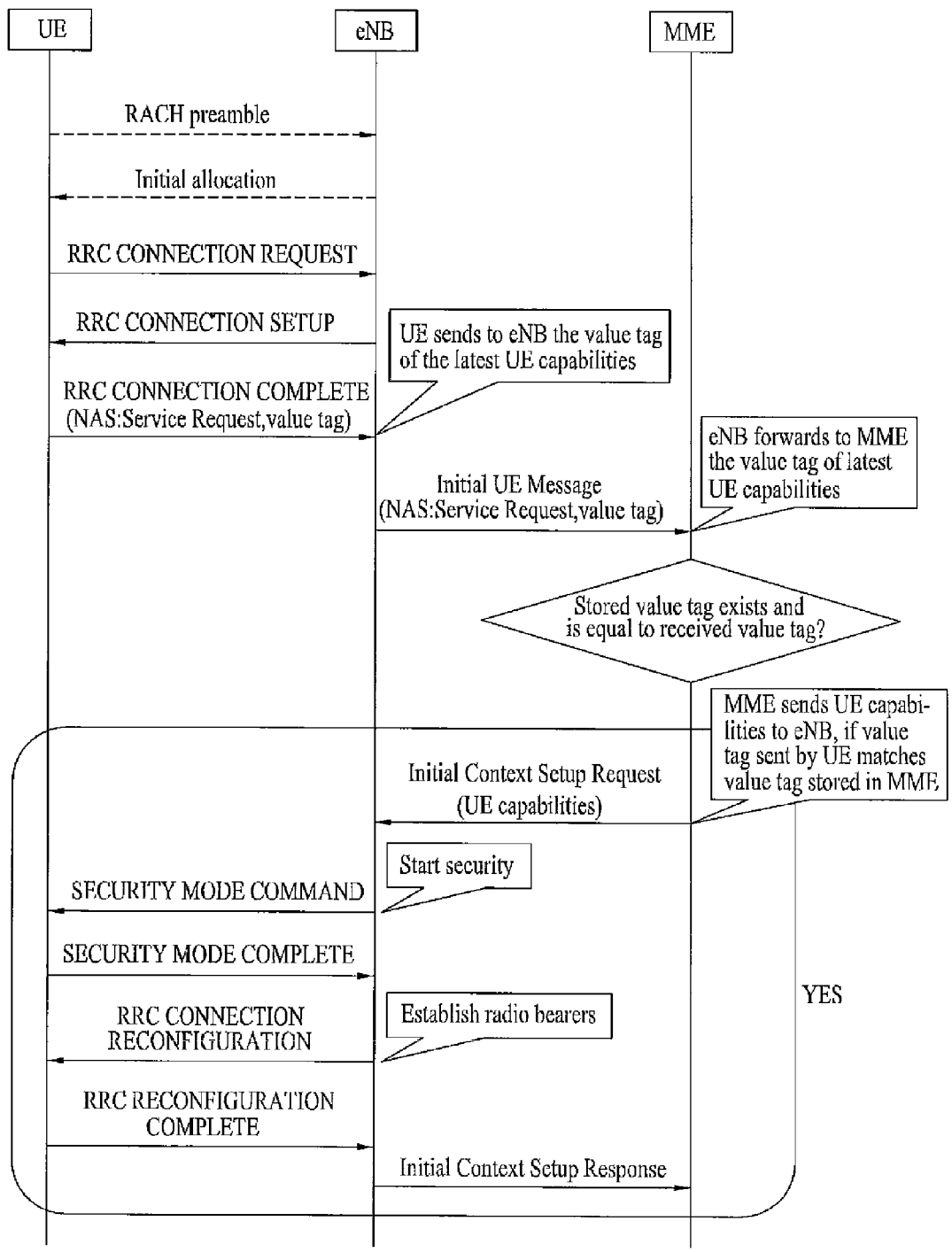
FIG. 9 is a flow chart illustrating a method for managing the UE capability in case of 'Service Request' according to one embodiment of the present invention.

FIG. 9 is a flow chart illustrating the 'Service Request' procedure performed when the MME has the latest UE capability information. In the above procedure, the UE capability information stored in the MME is transferred to the eNB and is then re-used, and associated detailed descriptions will hereinafter be described.

Step 1) The UE establishes the RRC connection. If the RRC connection has been successfully established, the UE transmits the 'RRC CONNECTION COMPLETE' message to the eNB. The UE allows the RRC message to have the NAS 'Service Request' message and the NAS value tag (i.e., first value tag) associated with the UE ability. The 'Service Request' message requests the MME to transfer the EMM mode from EMM-IDLE to EMM-CONNECTED mode and establish the radio and S1 bearers when uplink user data is to be sent. The 'Service Request' message also requests to invoke MO/MT CS fallback procedures Step 2) The eNB receives the RRC message, and transmits the NAS 'Service Request' message and the NAS value tag to the MME using the first S1 control message. In this case, the first S1 control message may be an 'Initial UE Message' or a control message corresponding to this 'Initial UE Message'.

Step 3) The MME having received the NAS 'Service Request' from the eNB determines whether or not the UE capability can be reused when the presence of the stored UE capability is decided. In other words, the MME determines whether or not the value tag (i.e., second value tag) associated with the corresponding UE capability exists, and compares the first value tag with the second value tag. Since the first value tag is identical with the second value tag, the MME considers that the stored UE capability is the latest information. Thereafter, the MME transmits the stored UE capability information to the eNB via the second S1 control message. The second S1 control message may be the 'Initial Context Setup Request' message or another message corresponding to this 'Initial Context Setup Request' message.

Step 4) The eNB receives the second S1 control message.

Step 5) The eNB performs the initial security activation. In this case, the UE capability information downloaded from the MME can be used.

Step 6) The eNB performs the RRC connection reconfiguration using the UE capability information downloaded from the MME.

Step 7) The eNB transmits a third S1 control message to the MME via the S1 interface in response to the second S1 control message. The third S1 control message may be an 'Initial Context Setup Response' message or another control message corresponding to this 'Initial Context Setup Response' message.

Figure 10:
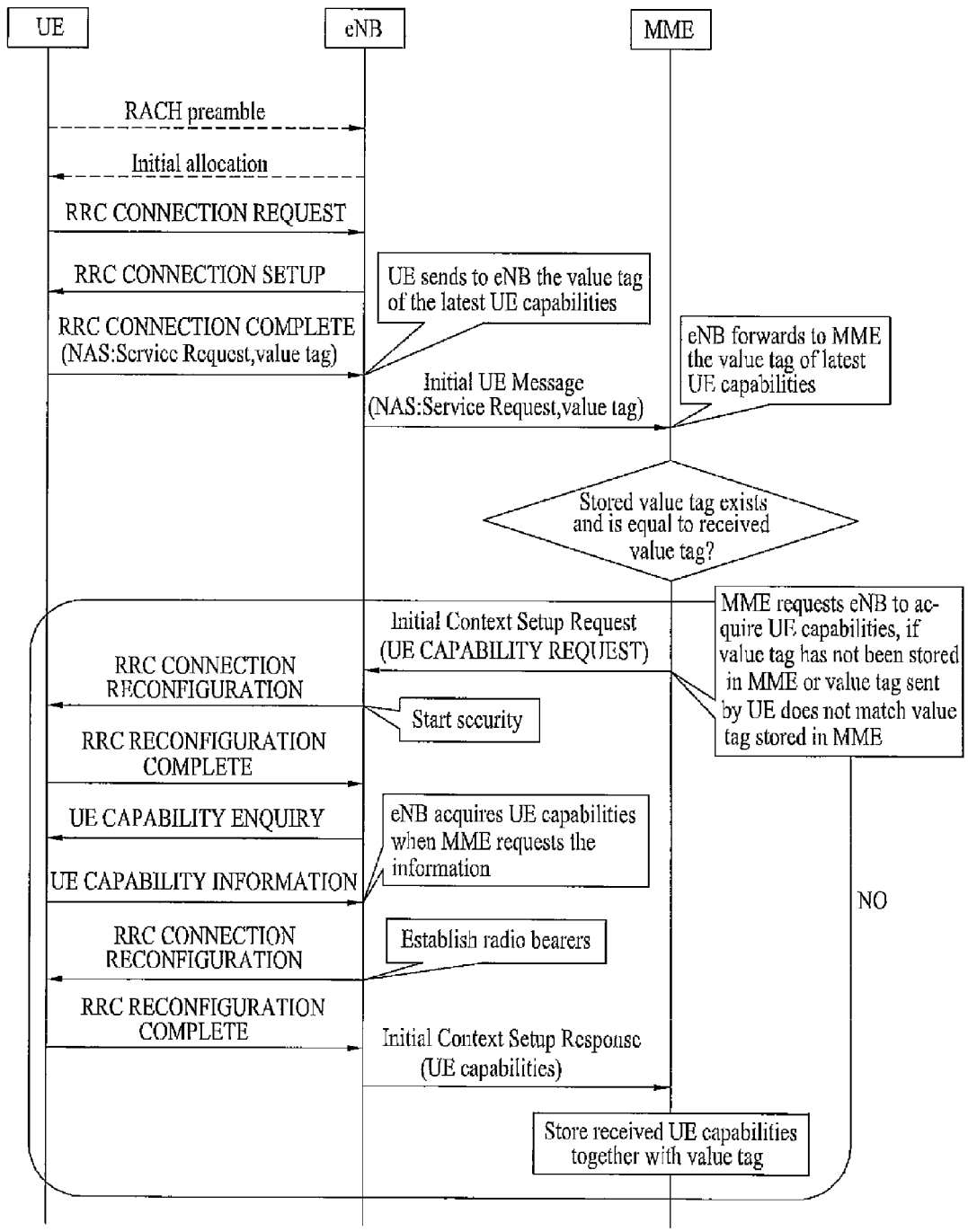
FIG. 10 is a flow chart illustrating a method for managing the UE capability in case of 'Service Request' according to another embodiment of the present invention.

FIG. 10 is a flow chart illustrating a method for managing the UE capability in case of 'Service Request' according to another embodiment of the present invention. FIG. 11 is a flow chart illustrating a method for managing the UE capability in case of 'Service Request' according to still another embodiment of the present invention. FIGS. 10-11 illustrate scenarios where the UE capability information stored in the MME is not reused. A detailed description of FIGS. 10-11 follows. Steps common to FIGS. 10-11 are described once.

Step 1) The UE establishes the RRC connection. If the RRC connection has been successfully established, the UE transmits the 'RRC CONNECTION COMPLETE' message to the eNB. The UE allows the RRC message to have the NAS 'Service Request' message and the NAS value tag (i.e., first value tag) associated with the UE ability.

Step 2) The eNB receives the RRC message, and transmits the NAS 'Service Request' message and the NAS value tag to the MME using the first S1 control message. In this case, the first S1 control message may be an 'Initial UE Message' or a control message corresponding to this 'Initial UE Message'.

Step 3) The MME having received the NAS 'Service Request' from the eNB determines whether or not the UE capability can be reused when the presence of the stored UE capability is decided. In other words, the MME determines whether or not the stored value tag (i.e., second value tag) associated with the corresponding UE capability exists, and compares the first value tag with the second value tag. Since the first value tag is different from the second value tag, the MME considers that the stored UE capability is not the latest information. Therefore, the MME requests the latest UE capability information corresponding to the first value tag from the eNB.

The MME is able to request the UE capability information in Step 3 using one of the following two methods i)~ii).

Method i) The second S1 control message transferred to the eNB via the S1 interface may include a control command requesting the UE capability information. The second S1 control message may be an 'Initial Context Setup Request' message or a control message corresponding to the 'Initial Context Setup Request'. The control command requesting the UE capability information may be the 'UE CAPABILITY REQUEST'. The 'UE CAPABILITY REQUEST' is just an indicator sent by MME to indicate that eNB needs to fetch UE capability from the concerned UE and possibly to forward the information to the MME. The eNB having received the control command receives the latest capability information from the UE, and transfers the above capability information to the MME as shown in FIG. 10.

Method ii) The second S1 control message transferred to the eNB via the S1 interface may not have the UE capability and the 'UE CAPABILITY REQUEST'. The second S1 control message may be the 'Initial Context Setup Request' message or a control message corresponding to this 'Initial Context Setup Request' message. In other words, requesting the latest UE capability from the eNB may be commanded by the second S1 control message having no UE capability and no 'UE Capability Request'. The eNB having received the second S1 control message receives the latest UE capability information, and transmits the received capability information to the MME as shown in FIG. 11.

Step 4) The eNB receives the second S1 control message from the MME.

Step 5) The eNB performs the initial security activation.

Step 6) The eNB receives a request from the MME in order to transmit the latest UE capability information to the MME, such that it receives the UE capability information via the RRC procedure (i.e., UE Capability transfer RRC procedure) transferring the UE capability.

Step 7) The eNB performs the RRC connection reconfiguration using the UE capability information received from the UE.

Step 8) The eNB allows the third S1 control message to have the UE capability information received from the UE, such that it transmits the resultant third S1 control message t the MME. The third S1 control message is a response to the second S1 control message received from the MME, and may be the 'Initial Context Setup Response' message or a control message corresponding to the 'Initial Context Setup Response' message.

Step 9) The MME stores the received UE capability information, and considers the stored information to be the latest capability information.

Step 10) The MME stores the value tag received simultaneously with the NAS 'Service Request' message, and considers that this stored value tag corresponds to the latest capability information.

In association with the step 10, the UE capability information received from the eNB may have the value tag. In this case, the MME ignores the value tag received simultaneously with the 'Service Request' message, and considers that the value tag contained in the UE capability information corresponds to the latest UE capability information, and stores this value tag.

Also, the order of the steps 6 and 7 may be changed to another order according to encryption or decryption of the RRC message associated with the 'UE Capability transfer' procedure.

Figure 11:
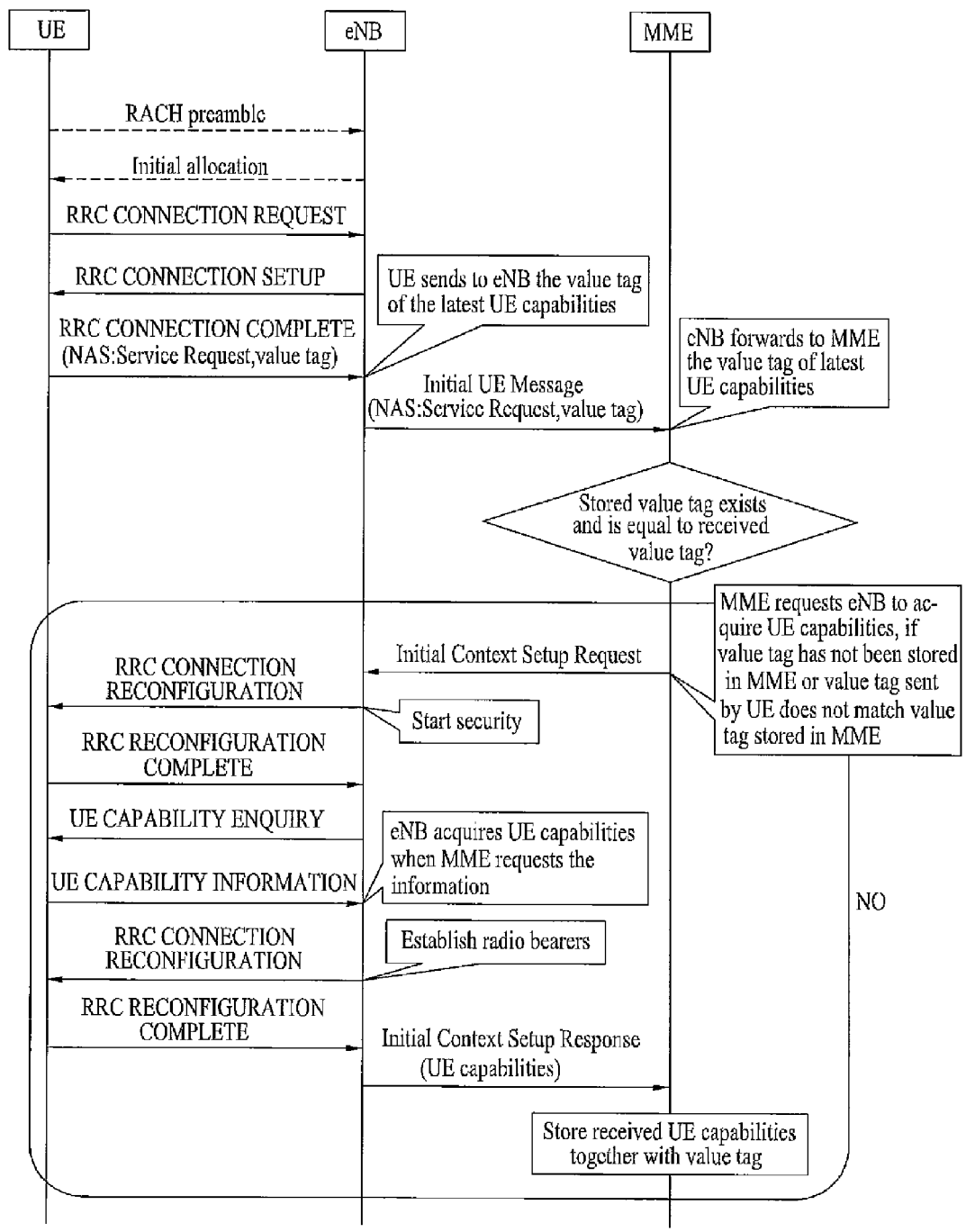
FIG. 11 is a flow chart illustrating a method for managing the UE capability in case of 'Service Request' according to still another embodiment of the present invention.

FIGS. 9 to 11 illustrate that the UE capability and its value tag are simultaneously stored. FIGS. 9 to 11 illustrate the relationship between the UE capability and its value tag. In an embodiment not shown in FIGS. 9-11, the UE capability and the value tag may be simultaneously stored or be stored in different times according to their implementation examples.

The above embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The above embodiments of the present invention have been described focusing mainly on the data communication relationship between a UE (or terminal) and a Base Station (BS). Specific operations which have been described as being performed by the BS may also be performed by upper nodes as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "terminal" may also be replaced with another term such as "user equipment (UE)", "mobile station (MS)", "mobile station (MS)", or "mobile subscriber station (MSS)".

The embodiments of the present invention can be implemented by hardware, firmware, software, or any combination thereof. In particular, the previously described UE, eNB and MME devices include one or more processors configured to execute the corresponding steps shown in FIGS. 7-11. The previously described UE, eNB and MME devices also include network interface devices and other communication modules. The previously described UE, eNB and MME devices may also include display and input devices or components.

Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various the embodiments of the present invention may also be implemented in the form of software modules, processes, functions, or the like which perform the features or operations described above. Software code can be stored in a memory unit so that it can be executed by a processor. The memory unit may be located inside or outside the processor and can communicate data with the processor through a variety of known means.

As apparent from the above description, the present invention can be applied to a method for managing UE capabilities in a wireless communication system. More particularly, the present invention relates to a method for managing the UE capability by a Mobility Management Entity (MME) of a network in the wireless communication system.

As apparent from the above description, the above-mentioned embodiments of the present invention have the following effects.

First, an amount of radio resources needed for transferring the UE capability can be greatly decreased.

Second, the UE transfers its capability information only when the UE capability is changed, resulting in reduction of an amount of overhead encountered by the UE operation.

Third, the present invention reduces an amount of UE capability information communicated between networks, such that it can increase the efficiency of network resource usage.

Fourth, the network entity operation is limited to a message directly related to a corresponding layer, such that independency between AS and NAS layers can be maintained.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of managing a User Equipment (UE) capability information by a Mobility Management Entity (MME) and a base station in a wireless communication system, the method comprising:

receiving a first status indication related to a UE capability information from the base station, the first status indication including a value tag corresponding to the UE capability information;

determining the UE capability information stored in the MME is the latest UE capability information and transmitting the latest UE capability information to the base station if a value tag stored in the MME and corresponding to the UE capability information is equal to the value tag in the received first status indication; and determining the UE capability information stored in the MME is not the latest UE capability information and transmitting a request message to the base station for obtaining the latest UE capability information from the UE if the value tag stored in the MME and corresponding to the UE capability information is not equal to the value tag in the first status indication.

2. The method of claim 1, wherein the first status indication is included in an S1 control message.

3. The method of claim 2, wherein the S1 control message is an 'Initial UE Message'.

4. The method of claim 2, further comprising:
determining whether or not a 'Service Request' is included in the S1 control message.

5. The method of claim 1, wherein the UE capability information is transmitted via a S1 control message, and the request message is the S1 control message.

6. The method of claim 5, wherein the S1 control message is an 'Initial Context Setup Request'.

7. The method of claim 5, wherein the S1 control message is a 'UE Capability Request'.

8. The method of claim 1, further comprising:
receiving the latest UE capability information from the base station and storing the latest UE capability information if the value tag in the first status indication is not equal to the value tag stored in the MME.

9. A Mobility Management Entity (MME) configured to manage a User Equipment (UE) capability information in a wireless communication system including a base station, comprising:

a controller configured to
receive a first status indication related to a UE capability information from the base station, the first status indication including a value tag corresponding to the UE capability information,
determine the UE capability information stored in the MME is the latest UE capability information and transmit the latest UE capability information to the base station if a value tag stored in the MME and corresponding to the UE capability information is equal to the value tag in the received first status indication, and
determine the UE capability information stored in the MME is not the latest UE capability information and transmit a request message to the base station for obtaining the latest UE capability information from the UE if the value tag stored in the MME and corresponding to the UE capability information is not equal to the value tag in the first status indication.

* * * * *